A. P. BRUSH.
CONTROLLING MECHANISM FOR CHANGE SPEED AND REVERSING GEARING.
APPLICATION FILED JULY 3, 1907.
975,393.
Patented Nov. 15, 1910.
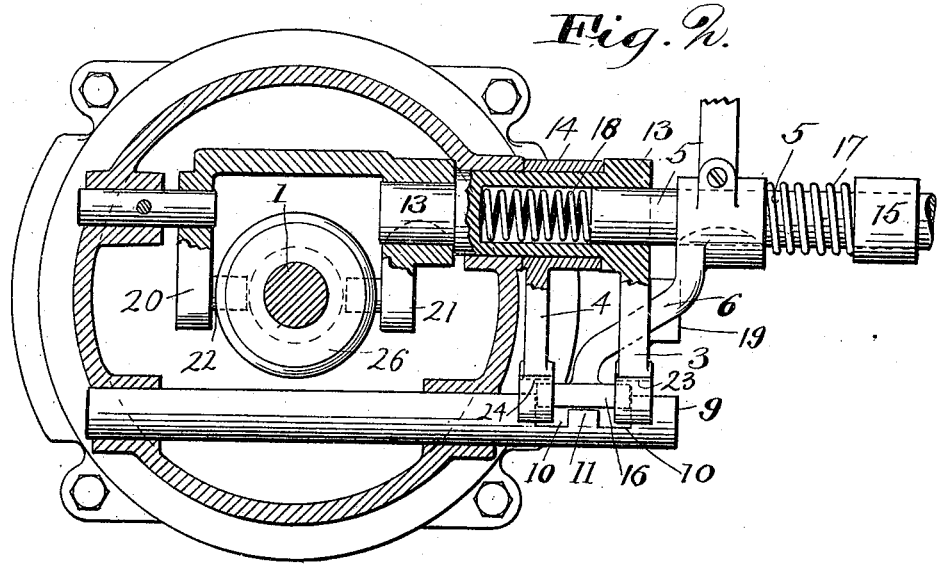
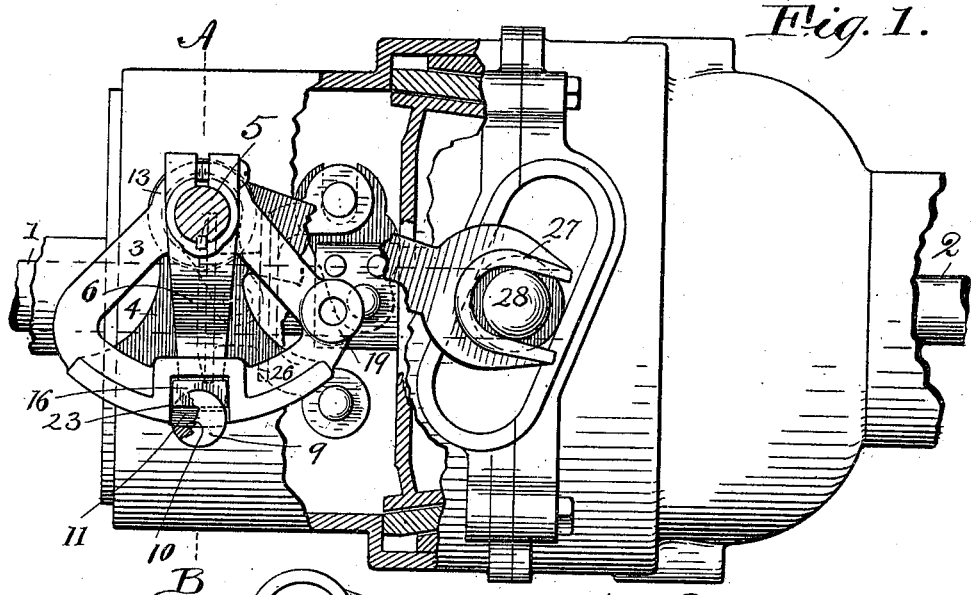
Witnesses
E. B. Gilchrist
H. B. Sullivan
Inventor
Alanson P. Brush
By Thurston Woodward
Attorneys

UNITED STATES PATENT OFFICE.

ALANSON P. BRUSH, OF DETROIT, MICHIGAN.

CONTROLLING MECHANISM FOR CHANGE-SPEED AND REVERSING GEARING.

975,393.  Specification of Letters Patent.  Patented Nov. 15, 1910.

Application filed July 3, 1907. Serial No. 381,968.

*To all whom it may concern:*

Be it known that I, ALANSON P. BRUSH, a citizen of the United States, residing at Detroit, in the county of Wayne and State of Michigan, have invented a certain new and useful Improvement in Controlling Mechanism for Change-Speed and Reversing Gearing, of which the following is a full, clear, and exact description.

The object of the invention is to provide means for controlling the operation of change speed and reversing gearing, such, for example, as is used on motor vehicles.

The invention, which is definitely pointed out in the appended claims, will be described in connection with the accompanying drawings representing the best embodiment of the invention known to me.

In the drawings, Figure 1 is a side elevation, partly broken away and sectioned, of change speed and reversing mechanism of the planetary type, showing my invention applied thereto. Fig. 2 is a transverse vertical sectional view in the plane indicated by line A—B of Fig. 1. Fig. 3 is a side elevation of the member 4.

Referring to the drawings 1 represents the driving member, and 2 the rotatable driven member of the change speed and reversing mechanism. Intermediate of these two rotatable parts is suitable gearing through which the driven member may be turned in the same direction as the driving shaft at either high or low speed, or may be turned in the reverse direction. The transmission gearing, indicated, but only partly shown, is of the planetary type and is specifically like that which forms the subject of my copending application No. 381,970, filed July 3, 1907; but the invention is applicable to sliding gear transmission or to any other form of transmission gearing having the capacity for transmitting motion at more than one speed forward, and of reversing the movement of the driven member.

In order to compel the transmission of high or low speed or of reverse movement, two operating members are required; and it is desirable that only one of them be capable of movement at one time from the neutral position.

In the drawing 3 and 4 represent the two operating members. They are mounted to rock independently about the same axis, which is also the axis of a rock shaft 5 carrying an arm 6 adapted to engage with either or both of said operating members and to rock them separately in either direction from the neutral position. In the specific construction shown the member 3 is fast on a rock shaft 13 which is suitably mounted; and member 4 is fast to a hub 14 loosely mounted on rock shaft 13. The rock shaft 5 is mounted in the end of shaft 13, and in another bearing 15; and the shaft 5 is capable of being moved endwise in its said bearings. Springs 18 and 17 thrust against opposite ends of shaft 5 to return it to its normal position in respect to endwise movement. The members 3 and 4 have notches 23 and 24, respectively, in their outer edges; and these notches normally embrace a locking bar 9. This bar lies parallel to the axis of the members 3 and 4, and is movable endwise. It has in its side a notch 10, divided into two parts by a rib 11; and each part of this notch is a little wider than the associated operating member 3 or 4. The arm 6 is bent laterally, passing through a wide opening in the member 3,—said member being in the form of a sector shaped open frame. The outer end of arm 6 lies normally midway between the members 3 and 4, and has on its outer end a T-shaped head 16 which enters the notch 10 in the locking bar,—its ends engaging with the ends of said notch. When the shaft 5 and its arm 6 are in this normal position in respect to endwise movement the head 16 projects at its ends respectively into the notches 23 and 24 of the members 3 and 4. Any suitable mechanism may be provided for moving shaft 5 endwise and for rocking it, as required.

It will be seen from the foregoing statement of the relation of the parts mentioned, that when in their normal positions, that when in those positions the members 3 and 4 are locked against movement by the locking bar 9 and that arm 6 and rock shaft 5 are locked against any rocking movement by the engagement of the head 16 with both the members 3 and 4. Before any of these parts can be moved away from its normal position shaft 5 must be moved endwise. If moved to the right, as shown, the head 16 will move out of engagement with member 4, but will retain its engagement with member 3. The head will also move the locking bar so as to bring the right subdivision of the notch 10 into line with the member 3, so as to free it and permit it to be rocked in one direction or the other as required. The arm 6, being now unrestrained by locked member 4, may be rocked so as to rock member 3 in either direction from its neutral position. If shaft 5 be moved in the other direction head 16 is withdrawn from engagement with member 3, and the locking bar is moved to the left so as to free member 4, which may then be rocked by arm 6 in either direction. When member 3 is rocked in one direction it may set the transmission mechanism to transmit high speed forward, and when rocked in the other direction it may set a brake,—the operating rod of which may be pivoted to a boss 19 on member 3. When member 4 is rocked in one direction, it may set the transmission mechanism to transmit low speed forward; and when rocked in the contrary direction may set it to transmit reverse motion. What mechanism shall be provided to enable members 3 and 4 to set the transmission as stated will depend upon the character of the transmission mechanism selected,—many of such mechanisms being well known.

The transmission mechanism indicated and partly shown in the drawing is of the planetary type, and is fully shown and described in a co-pending application. It is not thought necessary to explain that mechanism herein. It may be said, however, that the shaft 13 carries two arms 20 and 21 having pins 22, which engage with and operate an ordinary clutch operating sleeve 26, whereby the clutch is set or released, dependent upon the direction in which shaft 13 is rocked. Moreover the member 4 has a forked arm 27 which engages with a stud 28, whereby the latter may be moved in either direction. The moving of this stud in one direction applies a brake to one part of the planetary gearing, while the moving of said stud in the other direction applies a brake to another part of said gearing.

Having described my invention, I claim:

1. In mechanism for operating change speed and reversing gearing, the combination of two operating members mounted to rock upon the same axis and having notches in their outer ends, a notched locking bar which normally lies within both of said notches and is movable in a direction parallel with the axis of said members, an operating arm pivoted on the same axis as said operating members and having a head which projects into the notch in the locking bar and into the notches in both of said operating members, means for rocking said operating arm and for moving it in an axis direction whereby its head as it is moved out of engagement with one of said operating members will by engaging the locking bar move it and thereby disengage it from the other of said operating members.

2. In mechanism for controlling change speed and reversing gearing, the combination of two operating members capable of rocking upon the same axis and having notches in their outer ends and one of said operating members having a wide opening through it between its outer end and its center of oscillation, an operating arm which is pivoted on the same axis and is curved and extended through the said opening through the adjacent operating member, said operating arm having a head which normally projects into the notches in the outer ends of both operating members, means for moving the operating arm in an axial direction to free it from either of said operating members.

3. In mechanism for controlling change speed and reversing gearing, the combination of a tubular rock shaft having an arm in the outer end of which is a notch, a sleeve rotatably mounted upon said shaft and having an operating arm in the outer end of which is also a notch, a rock shaft rotatably mounted in said tubular rock shaft and having an arm fixed to it, which arm has a head which normally lies in the notches in both of said operating arms, the last named rock shaft being capable of rocking and of moving endwise relative to the tubular rock shaft, a spring within the tubular rock shaft engaging the solid rock shaft and resisting endwise movement thereof in one direction, a fixed bearing for the solid rock shaft, and a spring embracing the solid rock shaft and lying between said fixed bearing and the hub of the operating arm.

In testimony whereof, I hereunto affix my signature in the presence of two witnesses.

ALANSON P. BRUSH.

Witnesses:
E. L. THURSTON,
E. B. GILCHRIST.